Figure 1:
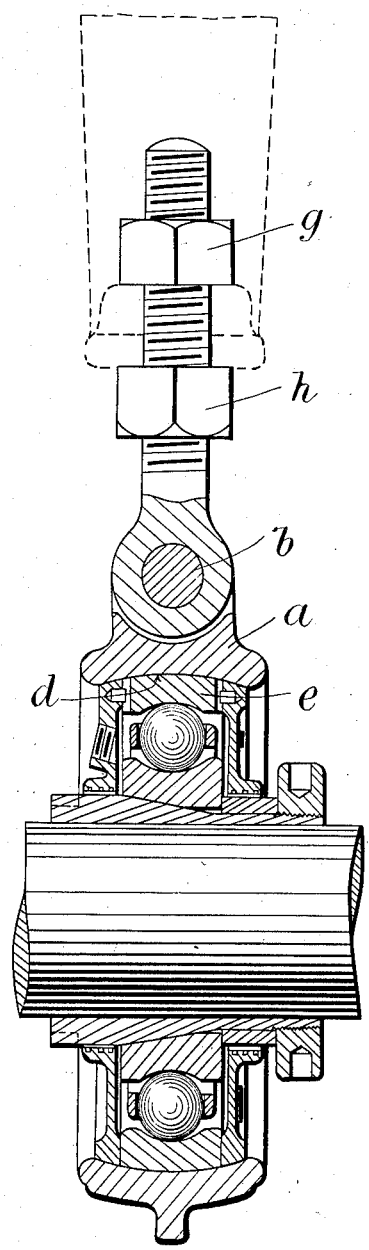

O. A. SCHMIDT.
SHAFT HANGER.
APPLICATION FILED NOV. 18, 1911.

1,043,631.

Patented Nov. 5, 1912.

2 SHEETS—SHEET 1.

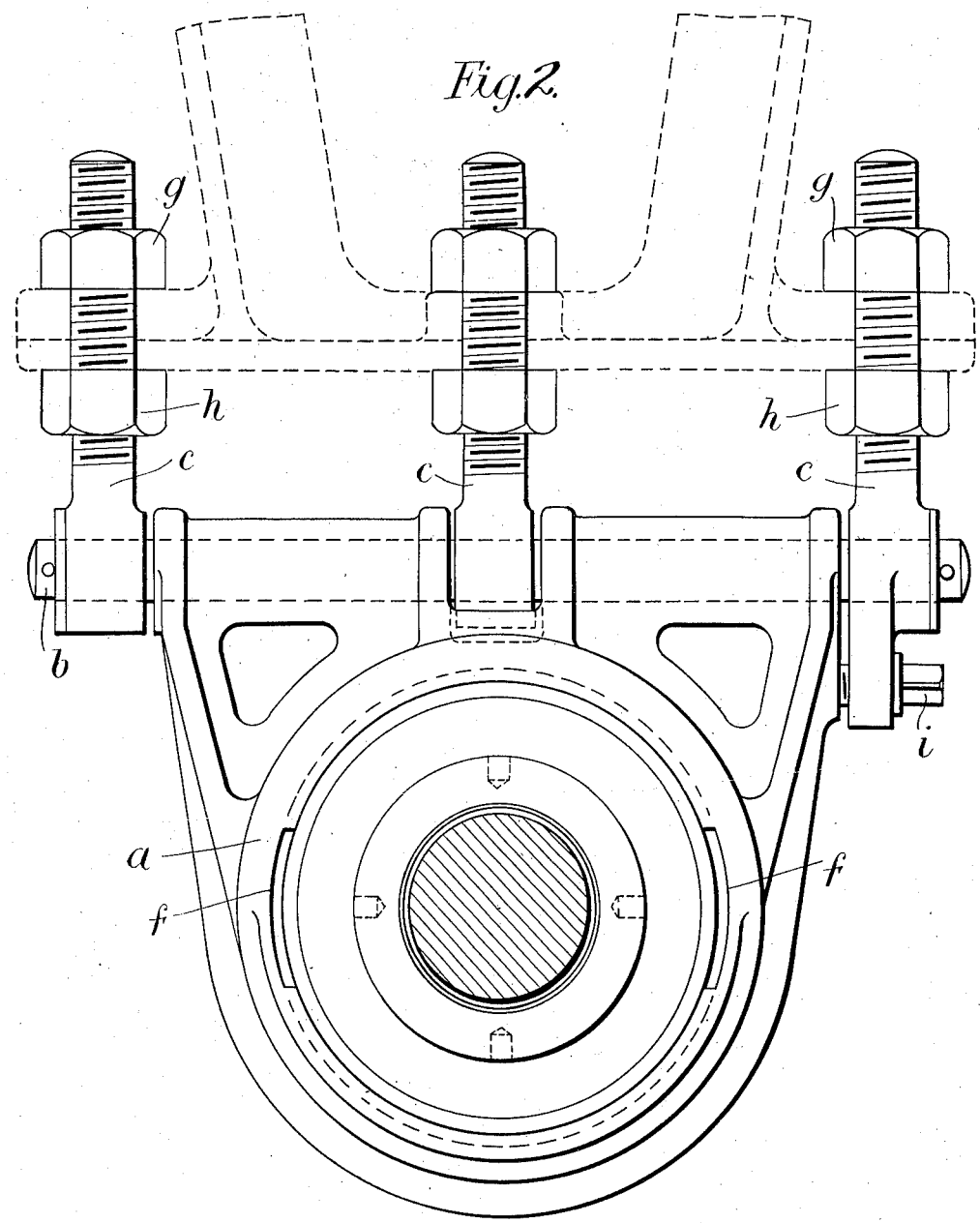

UNITED STATES PATENT OFFICE.

OTTO ALWIN SCHMIDT, OF CHELMSFORD, ENGLAND, ASSIGNOR TO THE HOFFMANN MANUFACTURING COMPANY, LIMITED, OF CHELMSFORD, ENGLAND.

SHAFT-HANGER.

1,043,631.  Specification of Letters Patent.  Patented Nov. 5, 1912.

Application filed November 18, 1911. Serial No. 661,068.

*To all whom it may concern:*

Be it known that I, OTTO ALWIN SCHMIDT, a subject of His Majesty the German Emperor, residing at Chelmsford, in the county of Essex, England, have invented certain new and useful Improvements in Shaft-Hangers, of which the following is a specification.

This invention relates to shaft hangers, pedestals and the like such as brackets and to anti-friction bearings employed in same, the object being to provide better means for allowing for irregularity of line in the shafting in all directions, and to prevent side thrust coming upon the races of the bearings.

Pivoting hangers and the like swinging in one plane are well known and these have carried housings for ball bearings capable of rotating in a plane at right angles thereto on pivots or trunnions and self-contained ball or roller bearings consisting of inner and outer race rings with balls or rollers between and capable of rocking in a spherical or other seat in a hanger or casing in all directions are also well known.

The present invention consists in a combination of a swinging hanger, pedestal, or the like, with the last mentioned self-contained rocking ball or roller bearing which presents considerable utility in providing for an elongation and contraction of the shaft which is entirely unrestrained so that side thrust is not allowed to come upon the ball or other tracks by reason of movement of the shaft in any direction which they are constructed to adapt themselves to.

The invention will be described in connection with the accompanying drawings, in which:—

Figure 1 is a cross section of one form of a hanger and bearing according to the invention; Fig. 2 is a front elevation of the hanger and bearing shown in Fig. 1.

In the form illustrated as an example in Figs. 1 and 2 a bearing of the known form is combined with a hanger comprising a housing *a* preferably of cast iron which in the form shown is pivotally hung on a spindle *b* freely suspended by eye bolts *c* at three points, the bolts being capable in turn of being attached to any convenient part, and of being adjusted and locked in position by nuts *g*, *h* so that adjustment vertically can be provided for. The housing has preferably formed directly in it the spherical seat *d*, in which the corresponding spherical face of the outer ring *e* of the bearing is capable of rocking. This bearing is of the known type and is inserted in its housing by turning the two rings at right angles to the housing and passing them into it through gaps *f f*, Fig. 2, which are provided for the purpose in the known manner or by any of the other suitable means or the bearing shown or a similar class of bearing with spherical seats in a casing having an outer cylindrical surface can be inserted into the housing *a* if the interior surface of the latter is suitably shaped to carry it and means are employed for securing the additional casing referred to; or other classes of anti friction bearings having spherical or like seats can if so adapted be inserted direct into the suitable seat provided in housing *a*.

It will be seen that the whole of the housing can swing on the spindle *b* so that side thrust is prevented from coming upon the ball races, and that irregularity of the shaft or alinement is allowed for by the spherical seat only. In a line shafting so constructed some side control must be allowed for, to prevent the shafting swinging as a whole. For this purpose one of the hangers or the like is provided with means to prevent it swinging. In Fig. 2 these means are shown as a pin or screw *i* passing through one part of the eye of one of the bolts *c* and entering the side of the housing.

What I claim is:—

In combination, a housing having a spherical internal seating, a spindle on which said housing is pivotally mounted, eye-bolts for supporting said spindle, a self contained annular ring anti-friction bearing having a spherical surface on its outer ring adapted to fit into said internal seating to enable it to rock in all directions in the housing, and a pin passing through one of the eye-bolts and entering the side of the housing for locking same to prevent swinging.

In witness whereof I have hereunto set my hand in the presence of two subscribing witnesses.

OTTO ALWIN SCHMIDT.

Witnesses:
W. BARNETT,
C. A. BARRETT.